United States Patent
Chun et al.

(10) Patent No.: US 8,411,583 B2
(45) Date of Patent: Apr. 2, 2013

(54) METHOD OF PERFORMING POLLING PROCEDURE IN A WIRELESS COMMUNICATION SYSTEM

(75) Inventors: Sung Duck Chun, Gyeonggi-do (KR); Young Dae Lee, Gyeonggi-do (KR); Sung Jun Park, Gyeonggi-do (KR); Seung June Yi, Gyeonggi-do (KR)

(73) Assignee: LG Electronics Inc., Seoul (KR)

( * ) Notice: Subject to any disclaimer, the term of this patent is extended or adjusted under 35 U.S.C. 154(b) by 582 days.

(21) Appl. No.: 12/212,546

(22) Filed: Sep. 17, 2008

(65) Prior Publication Data

US 2009/0103512 A1  Apr. 23, 2009

Related U.S. Application Data

(60) Provisional application No. 60/973,442, filed on Sep. 18, 2007, provisional application No. 60/981,807, filed on Oct. 22, 2007.

(30) Foreign Application Priority Data

Aug. 29, 2008  (KR) .................. 10-2008-0084996

(51) Int. Cl.
*H04L 12/56* (2006.01)
(52) U.S. Cl. ........ 370/252; 370/412; 370/419; 370/449; 370/465; 370/474; 370/475; 370/476
(58) Field of Classification Search ............. 370/465, 370/466, 467, 469, 474, 475, 476
See application file for complete search history.

(56) References Cited

U.S. PATENT DOCUMENTS

| | | | |
|---|---|---|---|
| 5,878,041 | A  | 3/1999 | Yamanaka et al. |
| 6,445,917 | B1 | 9/2002 | Bark et al. |
| 6,594,240 | B1 | 7/2003 | Chuah et al. |
| 6,594,244 | B1 | 7/2003 | Chang et al. |
| 6,728,918 | B1 | 4/2004 | Ikeda et al. |
| 6,738,624 | B1 | 5/2004 | Aksentijevic et al. |

(Continued)

FOREIGN PATENT DOCUMENTS

| | | |
|---|---|---|
| CN | 1339903 | 3/2002 |
| CN | 1390425 | 1/2003 |

(Continued)

OTHER PUBLICATIONS

ZTE, "Redundant Retransmission Restraint in RLC-AM," 3GPP TSG-RAN WG2 Meeting #53, R2-061234, May 8, 2006, XP-050131180.

(Continued)

*Primary Examiner* — Bo Hui A Zhu
(74) *Attorney, Agent, or Firm* — Lee, Hong, Degerman, Kang & Waimey

(57) ABSTRACT

A method of generating a data block for performing a polling procedure in a wireless communication system, a method of transmitting data and a method of performing a polling procedure are disclosed. A protocol layer performs the polling procedure for requesting a receiving side to transmit status report if there are no data to be transmitted to the receiving side in both a transmission buffer and a retransmission buffer. When determining whether there are no data to be transmitted to the receiving side in the retransmission buffer, it is preferable that a data block for which retransmission request information is not received from the receiving side is excluded.

12 Claims, 9 Drawing Sheets

U.S. PATENT DOCUMENTS

| | | |
|---|---|---|
| 6,862,450 B2 | 3/2005 | Mikola et al. |
| 6,874,113 B2 | 3/2005 | Chao et al. |
| 6,967,936 B1 | 11/2005 | Laroia et al. |
| 7,171,163 B2 | 1/2007 | Terry et al. |
| 7,180,885 B2 | 2/2007 | Terry |
| 7,227,857 B2 | 6/2007 | Kuo |
| 7,227,868 B2 | 6/2007 | Inden |
| 7,295,573 B2 | 11/2007 | Yi et al. |
| 7,313,116 B2 | 12/2007 | Lee et al. |
| 7,400,593 B2 | 7/2008 | Choi et al. |
| 7,450,933 B2 | 11/2008 | Kwak et al. |
| 7,486,699 B2 | 2/2009 | Yi et al. |
| 7,525,908 B2 | 4/2009 | Olsson et al. |
| 7,706,410 B2 | 4/2010 | Chun et al. |
| 7,710,930 B2 | 5/2010 | Kwak |
| 7,817,595 B2 | 10/2010 | Wu |
| 7,876,771 B2 | 1/2011 | Bergstrom et al. |
| 7,894,444 B2 * | 2/2011 | Lohr et al. .................. 370/394 |
| 7,978,616 B2 | 7/2011 | Chun et al. |
| 8,027,363 B2 | 9/2011 | Chun et al. |
| 8,031,689 B2 | 10/2011 | Guo |
| 8,059,597 B2 | 11/2011 | Park et al. |
| 8,081,662 B2 | 12/2011 | Chun et al. |
| 8,130,687 B2 | 3/2012 | Cai et al. |
| 8,160,012 B2 | 4/2012 | Chun et al. |
| 8,190,144 B2 | 5/2012 | Chun et al. |
| 8,203,988 B2 | 6/2012 | Chun et al. |
| 8,243,931 B2 | 8/2012 | Yi et al. |
| 2002/0001314 A1 | 1/2002 | Yi et al. |
| 2002/0009999 A1 | 1/2002 | Lee et al. |
| 2002/0024972 A1 | 2/2002 | Yi et al. |
| 2002/0114280 A1 | 8/2002 | Yi et al. |
| 2002/0122411 A1 | 9/2002 | Zimmerman et al. |
| 2003/0007490 A1 | 1/2003 | Yi et al. |
| 2003/0099305 A1 * | 5/2003 | Yi et al. ...................... 375/295 |
| 2003/0194992 A1 | 10/2003 | Kim et al. |
| 2004/0008659 A1 | 1/2004 | Kim |
| 2004/0022213 A1 | 2/2004 | Choi et al. |
| 2004/0076182 A1 | 4/2004 | Wu |
| 2004/0103435 A1 | 5/2004 | Yi et al. |
| 2004/0117860 A1 | 6/2004 | Yi et al. |
| 2004/0146019 A1 | 7/2004 | Kim et al. |
| 2004/0147236 A1 | 7/2004 | Parkvall et al. |
| 2004/0148396 A1 | 7/2004 | Meyer et al. |
| 2004/0153852 A1 | 8/2004 | Wu |
| 2004/0156330 A1 | 8/2004 | Yi et al. |
| 2004/0184438 A1 | 9/2004 | Terry |
| 2004/0208160 A1 | 10/2004 | Petrovic et al. |
| 2004/0223507 A1 | 11/2004 | Kuchibhotla et al. |
| 2004/0229626 A1 | 11/2004 | Yi et al. |
| 2005/0020260 A1 | 1/2005 | Jeong et al. |
| 2005/0026597 A1 | 2/2005 | Kim et al. |
| 2005/0039101 A1 | 2/2005 | Torsner |
| 2005/0041663 A1 | 2/2005 | Jiang |
| 2005/0041681 A1 | 2/2005 | Lee et al. |
| 2005/0042987 A1 | 2/2005 | Lee et al. |
| 2005/0047416 A1 | 3/2005 | Heo et al. |
| 2005/0054365 A1 | 3/2005 | Ahn et al. |
| 2005/0063347 A1 | 3/2005 | Sarkkinen et al. |
| 2005/0083943 A1 | 4/2005 | Lee et al. |
| 2005/0094596 A1 | 5/2005 | Pietraski et al. |
| 2005/0096017 A1 | 5/2005 | Kim |
| 2005/0100048 A1 | 5/2005 | Chun et al. |
| 2005/0105499 A1 | 5/2005 | Shinozaki et al. |
| 2005/0118992 A1 | 6/2005 | Jeong et al. |
| 2005/0147040 A1 | 7/2005 | Vayanos et al. |
| 2005/0164683 A1 | 7/2005 | Roberts et al. |
| 2005/0169293 A1 | 8/2005 | Zhang et al. |
| 2005/0192021 A1 | 9/2005 | Lee et al. |
| 2005/0193309 A1 | 9/2005 | Grilli et al. |
| 2005/0201354 A1 | 9/2005 | Hosaka et al. |
| 2005/0213605 A1 | 9/2005 | Kim et al. |
| 2005/0237932 A1 | 10/2005 | Liu |
| 2005/0237960 A1 | 10/2005 | Kim |
| 2005/0238051 A1 | 10/2005 | Yi et al. |
| 2005/0250526 A1 | 11/2005 | Lindoff et al. |
| 2005/0254467 A1 | 11/2005 | Li et al. |
| 2005/0259662 A1 | 11/2005 | Kim et al. |
| 2005/0286483 A1 | 12/2005 | Lee et al. |
| 2005/0287957 A1 | 12/2005 | Lee et al. |
| 2006/0007886 A1 | 1/2006 | Lee et al. |
| 2006/0030342 A1 | 2/2006 | Hwang et al. |
| 2006/0056441 A1 | 3/2006 | Jiang |
| 2006/0067238 A1 | 3/2006 | Olsson et al. |
| 2006/0067289 A1 | 3/2006 | Lee et al. |
| 2006/0067364 A1 | 3/2006 | Jung et al. |
| 2006/0072494 A1 | 4/2006 | Matusz |
| 2006/0072503 A1 | 4/2006 | Kim et al. |
| 2006/0084389 A1 | 4/2006 | Beale et al. |
| 2006/0092972 A1 | 5/2006 | Petrovic et al. |
| 2006/0098574 A1 | 5/2006 | Yi et al. |
| 2006/0128312 A1 | 6/2006 | Declerck et al. |
| 2006/0142020 A1 | 6/2006 | Mueckenheim et al. |
| 2006/0154603 A1 | 7/2006 | Sachs et al. |
| 2006/0154680 A1 | 7/2006 | Kroth et al. |
| 2006/0165045 A1 | 7/2006 | Kim et al. |
| 2006/0182065 A1 | 8/2006 | Petrovic et al. |
| 2006/0203780 A1 | 9/2006 | Terry |
| 2006/0233200 A1 | 10/2006 | Fifield et al. |
| 2006/0251027 A1 | 11/2006 | Chun et al. |
| 2006/0251105 A1 * | 11/2006 | Kim et al. ...................... 370/449 |
| 2006/0264179 A1 | 11/2006 | Bonneville et al. |
| 2006/0268798 A1 | 11/2006 | Kim et al. |
| 2006/0274690 A1 | 12/2006 | Chun et al. |
| 2006/0280145 A1 | 12/2006 | Revel et al. |
| 2007/0047452 A1 | 3/2007 | Lohr et al. |
| 2007/0047493 A1 | 3/2007 | Park et al. |
| 2007/0053309 A1 | 3/2007 | Poojary et al. |
| 2007/0060139 A1 | 3/2007 | Kim et al. |
| 2007/0079207 A1 | 4/2007 | Seidel et al. |
| 2007/0081468 A1 | 4/2007 | Timus |
| 2007/0081513 A1 * | 4/2007 | Torsner ...................... 370/349 |
| 2007/0091810 A1 | 4/2007 | Kim et al. |
| 2007/0097913 A1 | 5/2007 | Hanov |
| 2007/0117579 A1 | 5/2007 | Cai et al. |
| 2007/0178878 A1 | 8/2007 | Ding |
| 2007/0183358 A1 | 8/2007 | Cai |
| 2007/0189205 A1 | 8/2007 | Terry et al. |
| 2007/0201397 A1 | 8/2007 | Zhang |
| 2007/0223526 A1 | 9/2007 | Jiang |
| 2007/0258591 A1 | 11/2007 | Terry et al. |
| 2007/0268861 A1 | 11/2007 | Diachina et al. |
| 2007/0274278 A1 | 11/2007 | Choi et al. |
| 2007/0297360 A1 | 12/2007 | Joachim et al. |
| 2007/0297367 A1 | 12/2007 | Wang et al. |
| 2008/0008152 A1 | 1/2008 | Lohr et al. |
| 2008/0043658 A1 | 2/2008 | Worrall |
| 2008/0045224 A1 | 2/2008 | Lu et al. |
| 2008/0049682 A1 | 2/2008 | Ding et al. |
| 2008/0051098 A1 | 2/2008 | Rao |
| 2008/0059859 A1 | 3/2008 | Marinier et al. |
| 2008/0069108 A1 | 3/2008 | Yi et al. |
| 2008/0084851 A1 | 4/2008 | Kim et al. |
| 2008/0089285 A1 | 4/2008 | Pirskanen et al. |
| 2008/0101609 A1 | 5/2008 | Jiang |
| 2008/0146242 A1 | 6/2008 | Alanara et al. |
| 2008/0165717 A1 | 7/2008 | Chen et al. |
| 2008/0165755 A1 | 7/2008 | Marinier et al. |
| 2008/0182609 A1 | 7/2008 | Somasundaram et al. |
| 2008/0186936 A1 | 8/2008 | Chun et al. |
| 2008/0186944 A1 | 8/2008 | Suzuki et al. |
| 2008/0186946 A1 | 8/2008 | Marinier et al. |
| 2008/0198869 A1 * | 8/2008 | Jiang ............................ 370/449 |
| 2008/0212561 A1 | 9/2008 | Pani et al. |
| 2008/0212605 A1 | 9/2008 | Jiang |
| 2008/0233941 A1 | 9/2008 | Jen |
| 2008/0261581 A1 | 10/2008 | Cai |
| 2008/0268878 A1 | 10/2008 | Wang et al. |
| 2008/0273482 A1 | 11/2008 | Lee et al. |
| 2008/0318578 A1 | 12/2008 | Worrall |
| 2009/0005058 A1 | 1/2009 | Kazmi et al. |
| 2009/0016301 A1 | 1/2009 | Sammour et al. |
| 2009/0041240 A1 | 2/2009 | Parkvall et al. |
| 2009/0046631 A1 | 2/2009 | Meylan et al. |
| 2009/0046667 A1 | 2/2009 | Pelletier et al. |
| 2009/0046695 A1 * | 2/2009 | Jiang ............................ 370/346 |
| 2009/0104890 A1 | 4/2009 | Wang et al. |

| | | | |
|---|---|---|---|
| 2009/0116434 A1 | 5/2009 | Lohr et al. | |
| 2009/0119564 A1 | 5/2009 | Sagfors et al. | |
| 2009/0175163 A1 | 7/2009 | Sammour et al. | |
| 2009/0190480 A1 | 7/2009 | Sammour et al. | |
| 2009/0232076 A1 | 9/2009 | Kuo | |
| 2009/0259908 A1 | 10/2009 | Gollapudi | |
| 2009/0305712 A1 | 12/2009 | Franceschini et al. | |
| 2010/0014466 A1 | 1/2010 | Meyer et al. | |
| 2010/0091750 A1 | 4/2010 | Lee et al. | |
| 2010/0128648 A1 | 5/2010 | Lee et al. | |
| 2010/0142429 A1 | 6/2010 | Yi et al. | |
| 2010/0142457 A1 | 6/2010 | Chun et al. | |
| 2010/0157904 A1 | 6/2010 | Ho et al. | |
| 2010/0172282 A1 | 7/2010 | Zhang et al. | |
| 2010/0232335 A1 | 9/2010 | Lee et al. | |
| 2010/0260140 A1 | 10/2010 | Zhu | |
| 2011/0019604 A1 | 1/2011 | Chun et al. | |
| 2011/0033048 A1 | 2/2011 | Stanwood et al. | |

FOREIGN PATENT DOCUMENTS

| | | |
|---|---|---|
| CN | 1396780 | 2/2003 |
| CN | 1549610 | 11/2004 |
| CN | 1642067 | 7/2005 |
| CN | 1761260 | 4/2006 |
| CN | 1761356 | 4/2006 |
| CN | 1846365 | 10/2006 |
| CN | 1868157 | 11/2006 |
| CN | 1918825 | 2/2007 |
| CN | 1938969 | 3/2007 |
| CN | 1954521 | 4/2007 |
| CN | 1997227 | 7/2007 |
| CN | 101090281 | 12/2007 |
| EP | 1263160 | 12/2002 |
| EP | 1326397 | 7/2003 |
| EP | 1343267 | 9/2003 |
| EP | 1508992 | 2/2005 |
| EP | 1509011 | 2/2005 |
| EP | 1638237 | 3/2006 |
| EP | 1689130 A1 | 8/2006 |
| EP | 1746855 | 1/2007 |
| EP | 1768297 | 3/2007 |
| EP | 1796405 | 6/2007 |
| EP | 2026523 | 2/2009 |
| JP | 2000324161 | 11/2000 |
| JP | 2001197021 | 7/2001 |
| JP | 2002198895 | 7/2002 |
| JP | 2003018050 | 1/2003 |
| JP | 2003-115796 | 4/2003 |
| JP | 2003115876 | 4/2003 |
| JP | 2003229925 | 8/2003 |
| JP | 2003283592 | 10/2003 |
| JP | 2005073276 | 3/2005 |
| JP | 7162948 | 6/2005 |
| JP | 2006054718 | 2/2006 |
| JP | 2006505209 | 2/2006 |
| JP | 2006514466 | 4/2006 |
| JP | 2006121562 | 5/2006 |
| JP | 2006311543 | 11/2006 |
| JP | 2007116639 | 5/2007 |
| JP | 2007312244 | 11/2007 |
| JP | 2008520125 | 6/2008 |
| JP | 2009521893 | 6/2009 |
| KR | 1020010045783 | 6/2001 |
| KR | 1020010062306 | 7/2001 |
| KR | 1020020004645 | 1/2002 |
| KR | 10-2002-0012048 | 2/2002 |
| KR | 10-2002-0097304 | 12/2002 |
| KR | 20030060055 | 7/2003 |
| KR | 10-2003-0068743 | 8/2003 |
| KR | 20040034398 | 4/2004 |
| KR | 10-2004-0039944 | 5/2004 |
| KR | 10-2004-0072961 | 8/2004 |
| KR | 10-2005-0062359 | 6/2005 |
| KR | 10-2005-0081836 | 8/2005 |
| KR | 10-2005-0022988 | 9/2005 |
| KR | 10-2005-0092874 | 9/2005 |
| KR | 10-2005-0099472 | 10/2005 |
| KR | 1020050100882 | 10/2005 |
| KR | 10-2006-0004935 | 1/2006 |
| KR | 10-2006-0014910 | 2/2006 |
| KR | 10-2006-0029452 | 4/2006 |
| KR | 10-0566795 | 4/2006 |
| KR | 10-2006-0042858 | 5/2006 |
| KR | 1020060069378 | 6/2006 |
| KR | 1020060079784 | 7/2006 |
| KR | 20060090191 | 8/2006 |
| KR | 10-2006-0134058 | 12/2006 |
| KR | 10-0677131 | 2/2007 |
| KR | 1020070048552 | 5/2007 |
| KR | 10-2007-0076374 | 7/2007 |
| KR | 10-0907978 | 7/2009 |
| KR | 10-2009-0084756 | 8/2009 |
| RU | 2304348 | 8/2007 |
| TW | 496058 | 7/2002 |
| WO | 01/39386 | 5/2001 |
| WO | 03/045103 | 5/2003 |
| WO | 2004/042953 | 5/2004 |
| WO | 2004/042963 | 5/2004 |
| WO | 2005039108 A2 | 4/2005 |
| WO | 2005/078967 | 8/2005 |
| WO | 2005/122441 | 12/2005 |
| WO | 2005/125226 | 12/2005 |
| WO | 2005122441 | 12/2005 |
| WO | 2006/016785 | 2/2006 |
| WO | 2006/033521 | 3/2006 |
| WO | 2006/046894 | 5/2006 |
| WO | 2006052086 | 5/2006 |
| WO | 2006/083149 | 8/2006 |
| WO | 2006095385 | 9/2006 |
| WO | 2006/104335 | 10/2006 |
| WO | 2006/104342 | 10/2006 |
| WO | 2006/116620 | 11/2006 |
| WO | 2006/118418 | 11/2006 |
| WO | 2006/118435 | 11/2006 |
| WO | 2007/020070 | 2/2007 |
| WO | 2007/023364 | 3/2007 |
| WO | 2007024065 | 3/2007 |
| WO | 2007039023 A1 | 4/2007 |
| WO | 2007/052921 | 5/2007 |
| WO | 2007052900 | 5/2007 |
| WO | 2007/066900 | 6/2007 |
| WO | 2007/078142 | 7/2007 |
| WO | 2007/078155 | 7/2007 |
| WO | 2007/078164 | 7/2007 |
| WO | 2007/078174 | 7/2007 |
| WO | 2007/079085 | 7/2007 |
| WO | 2007078173 | 7/2007 |
| WO | 2007078174 | 7/2007 |
| WO | 2007/091831 | 8/2007 |
| WO | 2007089797 | 8/2007 |
| WO | 2007126793 | 11/2007 |
| WO | 2007147431 | 12/2007 |
| WO | 2008/004725 | 1/2008 |
| WO | 2008/010063 | 1/2008 |
| WO | 2008/094120 | 8/2008 |
| WO | 2009/035301 | 3/2009 |

OTHER PUBLICATIONS

European Telecommunication Standards Institute (ETSI), "Digital Cellular Telecommunications System (Phase 2+), Functional Stage 2 Description of Location Services (LCS) in GERAN," ETSI Technical Specification, ETSI TS 143 059, V7.3.0, May 2007, XP-014038519.
Texas Instruments, "UL Synchronization Management in LTE_ACTIVE," R1-071478, 3GPP TSG RAN WG1 #48bis, Mar. 2007, XP-050105413.
Texas Instruments, "UL Synchronization Management and Maintenance in E-UTRA," R1-072198, 3GPP TSG RAN WG1 #49, May 2007, XP-050105936.
LG Electronics Inc., "UE State Transition in LTE_ACTIVE," R2-061002, 3GPP TSG RAN WG2 #52, Mar. 2006, XP-050130928.
Ericsson, "Scheduling Request in E-UTRAN," R1-070471, 3GPP TSG RAN WG2 #47bis, Jan. 2007, XP-050104502.
Motorola, "Contention-Free Intra-LTE Handover," R2-070730, 3GPP TSG RAN WG2 #57, Feb. 2007, XP-050133763.
Kashima, T.; "Method and Apparatus for Providing Timing Alignment"; U.S. Appl. No. 60/944,662, filed Jun. 18, 2007.

Lin, L.C.; "Enhanced random access response formats in E-UTRA"; U.S. Appl. No. 61/006,348, filed Jan. 8, 2008.
Nokia, "Buffer Reporting for E-UTRAN," R2-060829, 3GPP TSG-RAN WG2 Meeting #52, Mar. 2006, XP-002503218.
Nokia, "Uplink Scheduling for VoIP," R2-070476, 3GPP TSG-RAN WG2 Meeting #57, Feb. 2007, XP-008125208.
Motorola, "Synchronized Random Access Channel and Scheduling Request," R1-063046, 3GPP TSG RAN1#47, Nov. 2006.
NTT DoCoMo et al., "Scheduling Request Transmission Method for E-UTRA Uplink," R1-063301, 3GPP TSG RAN WG1 Meeting #47, Nov. 2006.
Ericsson, "Basic Principles for the Scheduling Request in LTE," R2-062350, 3GPP TSG RAN WG2 #54, Aug. 2006.
Ericsson et al., "Framework for Scheduling Request and Buffer Status Reporting," R2-074691, TSG-RAN WG2 Meeting #60, Nov. 2007.
Nokia, "System Information Distribution," 3GPP TSG-RAN WG2 Ad Hoc Meeting on LTE, R2-061487, Jun. 27, 2006.
LG Electronics Inc., "Delivery of LTE System Information," 3GPP TSG-RAN WG2 Ad Hoc Meeting on LTE, R2-061959, Jun. 27, 2006.
Sadayuki, A., et al., "Super 3G Technology Trends, Part 2: Research on Super 3G Technology," NTT DoCoMo Technical Journal, Dec. 2006, vol. 8, No. 3, pp. 55-62.
Ghosh, A., et al., "Random Access Design for UMTS Air-Interface Evolution," IEEE 65th Vehicular Technology Conference 2007, VTC2007-Spring , Apr. 22, 2007, pp. 1041-1045.
NEC, "Optimized Buffer Status Reporting," 3GPP TSG-RAN WG2# 58bis Meeting, R2-072515, XP-002503220, Jun. 25, 2007.
Catt, et al.,"Consideration on UL Buffer Reporting," 3GPP TSG-RAN WG2 #55, R2-062934, XP-002513924, Oct. 9, 2006.
Wang, P.S., "Operation of Control Protocol Data Units in Packet Data Convergence Protocol," U.S. Appl. No. 60/976,139, filed Sep. 28, 2007.
Mukherjee, R.P. "Method and Apparatus of Performing Packet Data Convergence Protocol Reset," U.S. Appl. No. 61/019,058, filed Jan. 4, 2008.
LG Electronics Inc., "Correction of status report coding," 3GPP TSG RAN WG2 #61, R2-080969, Feb. 2008, XP-002624626.
Alcatel-Lucent, "PDCP status report carrying LIS only," 3GPP TSG RAN WG2 #61, R2-080902, Jan. 2008, XP-050138711.
3rd Generation Partnership Project (3GPP), "Technical Specification Group Radio Access Network; Evolved Universal Terrestrial Radio Access (E-UTRA); Packet Data Convergence Protocol (PDCP) specification (Release 8)," 3GPP TS 36.323, V8.2.1, May 2008, XP-050377638.
LG Electronics, "Correction to PDCP Status Report," 3GPP TSG-RAN2 Meeting #61 bis, R2-081594, Mar. 2008, XP-002624627.
Qualcomm Europe, "Further Details on RACH Procedure," 3GPP TSG-RAN WG1 #48, R1-070649, Feb. 2007.
NTT DoCoMo, Inc., "Buffer Status Report and Scheduling Request triggers," 3GPP TSG-RAN WG2 #59, R2-073574, Aug. 2007.
ITRI, "Buffer Status Reporting with Group Combining for LTE", R2-072833, 3GPP TSG-RAN-WG2 Meeting #58bis, Jun. 2007.
NEC, "Considerations on Scheduling Information", R2-073556, 3GPP TSG-RAN WG2#59, Aug. 2007.
"Universal Mobile Telecommunications System (UMTS); Radio Link Control (RLC) protocol specification (3GPP TS 25.322 version 4.10.0 Release 4)", ETSI TS 125 322, Sep. 2003, XP-014016803.
LG Electronics Inc, "Correction to Polling Procedure", R2-081588, 3GPP TSG-RAN WG2 #61bis, Mar. 2008, XP-050139320.
LG Electronics, "Update of eUtran PDCP specification", R2-081390, 3GPP TSG-RAN2 Meeting #61, Jan. 2008.
Ericsson, "RLC status report format", R2-074701, TSG-RAN WG2 Meeting #60, Nov. 2007.

QUALCOMM Europe, "UL requests", R1-070426, 3GPP TSG-RAN WG1 #47bis, Jan. 2007.
ASUSTeK Computer Inc., "HFN de-synchronization detection with Integrity Protection scheme in a wireless communications system", U.S. Appl. No. 60/863,800.
QUALCOMM Europe, "Scheduling request mechanism", R1-071276, 3GPP TSG-RAN WG1 #48bis, Mar. 2007.
Texas Instruments, "Scheduling Request and DRX in E-UTRA", R1-072859, 3GPP TSG RAN WG1 #49bis, Jun. 2007.
Nokia Siemens Networks, "Update on Security, System Information, Mobility, MBMS and DRX", R2-073863, 3GPP TSG-RAN2 Meeting #59, Aug. 2007.
Ericsson, "SDU Discard", R2-073230, 3GPP TSG-RAN WG2 #59, Aug. 2007.
3rd Generation Partnership Project (3GPP); "Technical Specification Group Radio Access Network; Evolved Universal Terrestrial Radio Access (E-UTRA) Medium Access Control (MAC) protocol specification (Release 8)", 3GPP TS 36.321 V1.0.0, Sep. 2007.
Motorola, "MAC Header format", R2-074419, 3GPP TSG-RAN2 Meeting #59bis, Oct. 2007.
NTT DoCoMo, Inc. et al, "MAC PDU structure for LTE", R2-074174, 3GPP TSG RAN WG2 #59bis, Oct. 2007.
3rd Generation Partnership Project (3GPP); "Technical Specification Group Radio Access Network; Medium Access Control (MAC) protocol specification (Release 7)", 3GPP TS 25.321 V7.5.0, Jun. 2007.
"LTE User Plane session report", R2-074536, 3GPP TSG RAN WG2 #59bis, Oct. 2008.
Rapporteur (ASUSTeK), "Summary of HFN de-synchronization problem off-line email discussion", R2-050318, 3GPP TSG RAN WG2 #46, Feb. 2005.
ASUSTeK, "On-line recovery of HFN synchronization due to RLC UM SN problem", R2-041940, 3GPP TSG-RAN WG2 meeting #44, Oct. 2004.
3rd Generation Partnership Project (3GPP); "Technical Specification Group Radio Access Network; Evolved Universal Terrestrial Radio Access (E-UTRA) Radio Link Control (RLC) protocol specification (Release 8)", 3GPP TS 36.322 V8.0.0, Dec. 2007.
"Miscellaneous corrections to TS 36.322", R2-081700, 3GPP TSG-RAN2 Meeting #61bis, Mar. 2008.
Ericsson, "Clarification to the handling of large RLC status reports", R2-082018, 3GPP TSG-RAN2 Meeting #61bis, Mar. 2008.
LG Electronics Inc. et al., "ACK_SN setting for short STATUS PDU", R2-082133, 3GPP TSG-RAN WG2 #62, May 2008.
Alcatel-Lucent, "Format For RACH Message 2", 3GPP TSG RAN WG2 #60bis, R2-080176, Jan. 2008.
Motorola, "Design of Backoff Scheme for LTE", 3GPP TSG-Ran-WG2 #56bis, R2-070143, Jan. 2007.
MAC Rapporteurs, "E-Utra Mac Protocol Specification Update", 3GPP TSG-RAN2, #60bis R2-080631, Jan. 2008.
United States Patent and Trademark Office Application U.S. Appl. No. 12/738,625, Non-Final Office Action dated Oct. 24, 2012, 11 pages.
In the USPTO U.S. Appl. No. 12/733,179, Non-Final Office Action dated Oct. 31, 2012, 14 pages.
United States Patent and Trademark Office U.S. Appl. No. 13/441,698, Office Action dated Nov. 21, 2012, 9 pages.
United States Patent and Trademark Office U.S. Appl. No. 12/922,538, Office Action dated Nov. 23, 2012, 12 pages.
United States Patent and Trademark Office U.S. Appl. No. 12/452,905, Office Action dated Dec. 3, 2012, 13 pages.
United States Patent and Trademark Office U.S. Appl. No. 12/452,733, Final Office Action dated Jan. 8, 2013, 19 pages.

* cited by examiner

METHOD OF PERFORMING POLLING PROCEDURE IN A WIRELESS COMMUNICATION SYSTEM

CROSS-REFERENCED TO RELATED APPLICATIONS

Pursuant to 35 U.S.C. §119, this application claims the benefit of earlier filing date and right of priority to U.S. Provisional Application No. 60/973,442, filed on Sep. 18, 2007 and U.S. Provisional Application No. 60/981,807, filed on Oct. 22, 2007, and Korean Application No. 10-2008-0084996, filed on Aug. 29, 2008 the contents of which are hereby incorporated by reference herein in their entirety.

TECHNICAL FIELD

The present invention relates to a wireless communication system, and more particularly, to a method of generating a data block for performing a polling procedure in a wireless communication system, a method of transmitting data and a method of performing a polling procedure.

BACKGROUND ART

Various types of data retransmission methods can be used to ensure certainty of data transmission to a receiving side in a wireless communication system. Particularly, the need to use a retransmission method increases when the receiving side should necessarily receive non-real time packet data such as signaling data or TCP/IP data.

An example of the data transmission method used in the wireless communication system will be described as follows. The receiving side transmits a status report to a transmitting side to report that at least one or more data blocks transmitted from the transmitting side have been successfully received. The transmitting side retransmits data blocks that the receiving side has failed to receive, to the receiving side using the status report. For application of the retransmission method, data which have been transmitted once should be stored in a buffer for a certain time period without discard. Accordingly, a transmission buffer and a retransmission buffer are required, wherein data which have never been transmitted to the receiving side are stored in the transmission buffer and data which have been transmitted to the receiving side but need to be on standby for retransmission are stored in the retransmission buffer.

The transmitting side can request the receiving side to transmit the status report. This procedure is referred to as a polling procedure. If the status report transmitted from the receiving side is lost during transmission or the receiving side does not transmit the status report to the transmitting side timely, the transmitting side can perform the polling procedure. Alternatively, the transmitting side can perform the polling procedure periodically.

DISCLOSURE OF THE INVENTION

A transmitting side has to use additional radio resources to perform a polling procedure. Accordingly, for efficient use of radio resources, the polling procedure should be prevented from being used unnecessarily. To this end, reasonable standards as to when the transmitting side should perform the polling procedure are required.

Accordingly, the present invention is directed to a method of generating a data block for performing a polling procedure in a wireless communication system, a method of transmitting data and a method of performing a polling procedure, which substantially obviate one or more problems due to limitations and disadvantages of the related art.

An object of the present invention is to provide a method of generating a data block for performing a polling procedure in a wireless communication system, a method of transmitting data and a method of performing a polling procedure, in which the polling procedure is performed while radio resources are being used efficiently.

Another object of the present invention is to provide a method of generating a data block for performing a polling procedure in a wireless communication system, a method of transmitting data and a method of performing a polling procedure, in which a transmitting side performs the polling procedure timely to prevent communication from being stopped unexpectedly.

In a wireless communication system, a data retransmission function is performed by a specific protocol layer. To perform the data retransmission function, the protocol layer is equipped with a transmission buffer and a retransmission buffer. The protocol layer can determine whether to perform a polling procedure considering statuses of the transmission buffer and the retransmission buffer, i.e., the amount of data stored in the transmission buffer and the retransmission buffer.

In one aspect of the present invention, the protocol layer performs the polling procedure for requesting a receiving side to transmit a status report if there are no data to be transmitted to the receiving side in both the transmission buffer and the retransmission buffer. When determining whether there are no data to be transmitted to the receiving side in the retransmission buffer, it is preferable that a data block for which retransmission request information is not received from the receiving side is excluded.

In another aspect of the present invention, the protocol layer performs the polling procedure considering the amount of data transmitted to the receiving side. Namely, the protocol layer performs the polling procedure if the amount of data transmitted to the receiving side reaches a certain level or greater. This procedure can be performed repeatedly.

According to the present invention, radio resources can efficiently be used during the polling procedure, and the transmitting side can perform the polling procedure timely, whereby communication can be prevented from being stopped unexpectedly.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principles of the invention.

FIG. 3A and FIG. 3B are diagrams illustrating a structure of a radio interface protocol between a user equipment (UE) and E-UTRAN, in which FIG. 3A is a schematic view of a control plane protocol and FIG. 3B is a schematic view of a user plane protocol;

BEST MODE FOR CARRYING OUT THE INVENTION

Hereinafter, structures, operations, and other features of the present invention will be understood readily by the preferred embodiments of the present invention, examples of which are illustrated in the accompanying drawings. Embodiments described later are examples in which technical features of the present invention are applied to an E-UMTS (Evolved Universal Mobile Telecommunications System). However, it should be noted that an embodiment of the present invention can be applied to a wireless communication system other that the E-UMTS.

Figure 1:
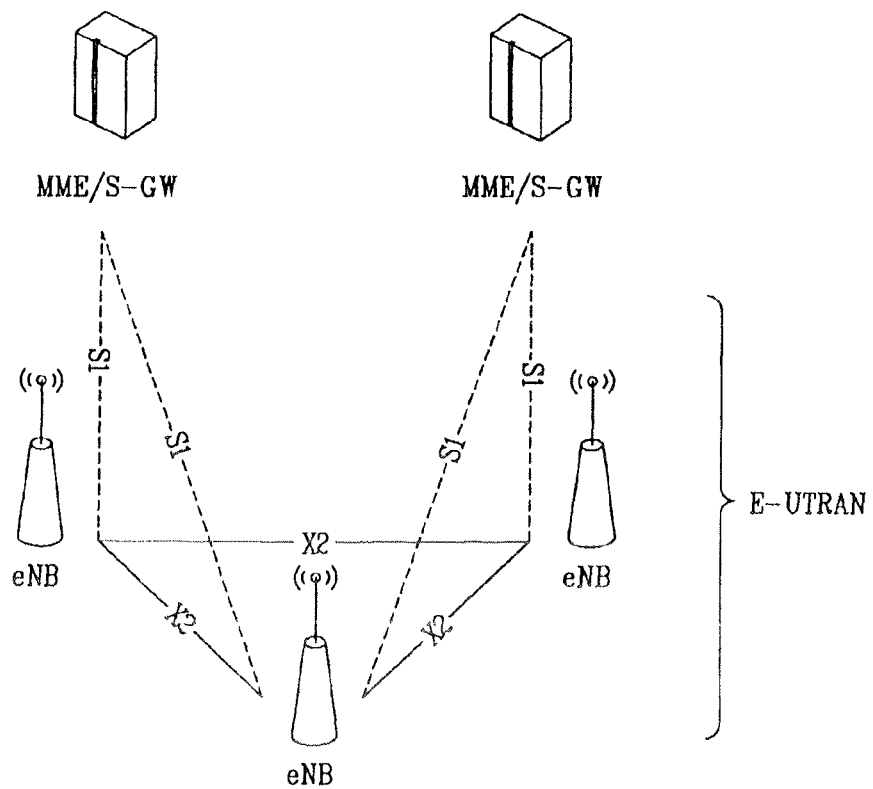
FIG. 1 is a diagram illustrating a network structure of an E-UMTS (Evolved Universal Mobile Telecommunications System)

FIG. 1 is a diagram illustrating a network structure of an E-UMTS. An E-UMTS is a system evolving from the conventional WCDMA UMTS and its basic standardization is currently handled by the 3GPP ($3^{rd}$ Generation Partnership Project). The E-UMTS can also be called an LTE (Long Term Evolution) system.

Referring to FIG. 1, an E-UTRAN includes base stations (hereinafter, referred to as 'eNode B' or 'eNB'), wherein respective eNBs are connected with each other through X2 interface. Also, each of eNBs is connected with a user equipment (UE) through a radio interface and connected with EPC (Evolved Packet Core) through S1 interface. The EPC includes a mobility management entity/system architecture evolution (MME/SAE) gateway.

Layers of a radio interface protocol between a user equipment and a network can be classified into a first layer L1, a second layer L2 and a third layer L3 based on three lower layers of OSI (open system interconnection) standard model widely known in communication systems. A physical layer belonging to the first layer L1 provides an information transfer service using a physical channel. A radio resource control (hereinafter, abbreviated as 'RRC') located at the third layer plays a role in controlling radio resources between the user equipment and the network. For this, the RRC layer enables RRC messages to be exchanged between the UE and the network. The RRC layer can be distributively located at network nodes including Node B, an AG and the like or can be independently located at either the Node B or the AG.

Figure 2:
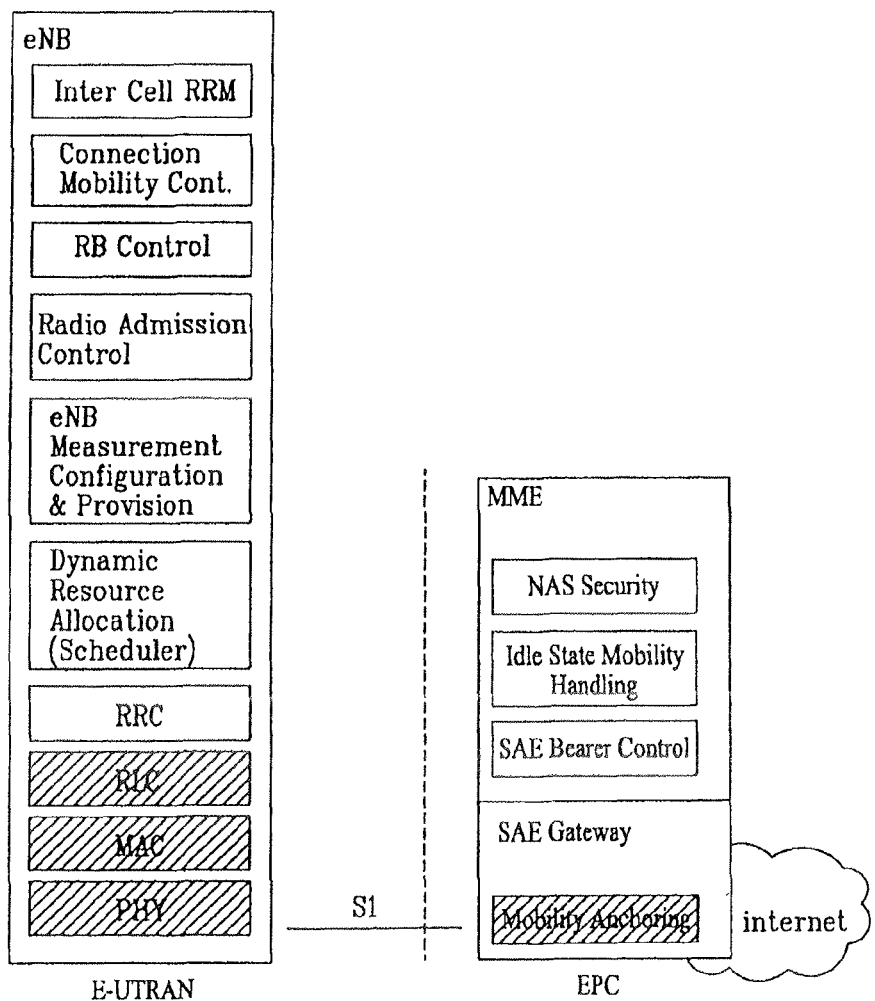
FIG. 2 is a schematic view illustrating an E-UTRAN (Evolved Universal Terrestrial Radio Access Network)

FIG. 2 is a schematic view illustrating an E-UTRAN (Evolved Universal Terrestrial Radio Access Network). In FIG. 2, a hatching part represents functional entities of a user plane, and a non-hatching part represents functional entities of a control plane.

Figure 3A:
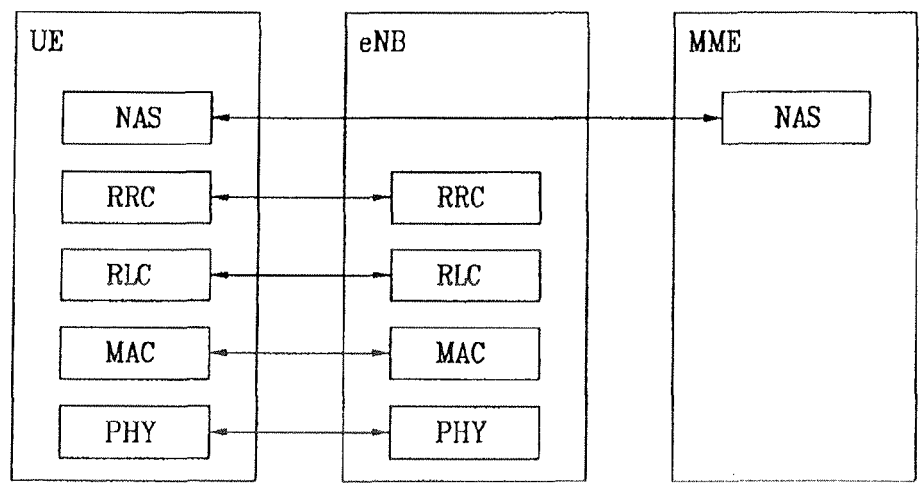
Figure 3B:
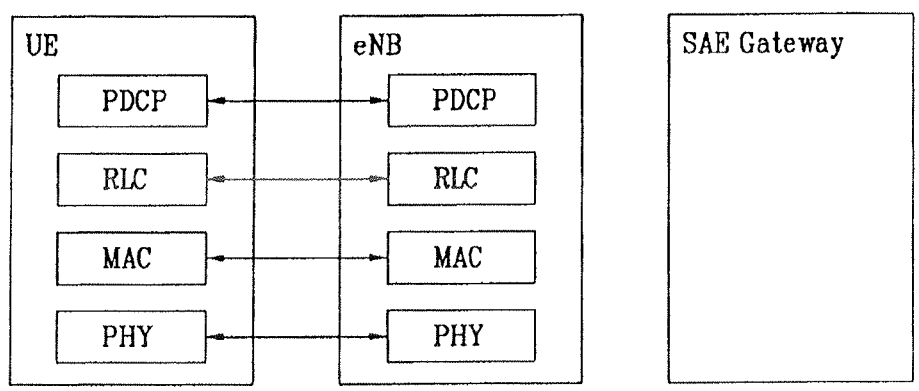

FIG. 3A and FIG. 3B illustrate a structure of a radio interface protocol between the user equipment (UE) and the E-UTRAN, in which FIG. 3A is a schematic view of a control plane protocol and FIG. 3B is a schematic view of a user plane protocol. Referring to FIG. 3A and FIG. 3B, a radio interface protocol horizontally includes a physical layer, a data link layer, and a network layer, and vertically includes a user plane for data information transfer and a control plane for signaling transfer. The protocol layers in FIG. 3A and FIG. 3B can be classified into L1 (first layer), L2 (second layer), and L3 (third layer) based on three lower layers of the open system interconnection (OSI) standard model widely known in the communications systems.

The physical layer as the first layer provides an information transfer service to an upper layer using physical channels. The physical layer (PHY) is connected to a medium access control (hereinafter, abbreviated as 'MAC') layer above the physical layer via transport channels. Data are transferred between the medium access control layer and the physical layer via the transport channels. Moreover, data are transferred between different physical layers, and more particularly, between one physical layer of a transmitting side and the other physical layer of a receiving side via the physical channels. The physical channel of the E-UMTS is modulated in accordance with an orthogonal frequency division multiplexing (OFDM) scheme, and time and frequency are used as radio resources.

The medium access control (hereinafter, abbreviated as 'MAC') layer of the second layer provides a service to a radio link control (hereinafter, abbreviated as 'RLC') layer above the MAC layer via logical channels. The RLC layer of the second layer supports reliable data transfer. In order to effectively transmit data using IP packets (e.g., IPv4 or IPv6) within a radio-communication period having a narrow bandwidth, a PDCP layer of the second layer (L2) performs header compression to reduce the size of unnecessary control information.

A radio resource control (hereinafter, abbreviated as 'RRC') layer located on a lowest part of the third layer is defined in the control plane only and is associated with configuration, reconfiguration and release of radio bearers (hereinafter, abbreviated as 'RBs') to be in charge of controlling the logical, transport and physical channels. In this case, the RB means a service provided by the second layer for the data transfer between the user equipment and the UTRAN.

Examples of downlink transport channels carrying data from the network to the user equipments include a broadcast channel (BCH) carrying system information, a paging channel (PCH) carrying paging message, and a downlink shared channel (SCH) carrying user traffic or control messages. The traffic or control messages of a downlink multicast or broadcast service can be transmitted via the downlink SCH or an additional downlink multicast channel (MCH). Meanwhile, examples of uplink transport channels carrying data from the user equipments to the network include a random access channel (RACH) carrying an initial control message and an uplink shared channel (UL-SCH) carrying user traffic or control message.

Examples of logical channels located above the transport channels and mapped with the transport channels include a broadcast control channel (BCCH), a paging control channel (PCCH), a common control channel (CCCH), a multicast control channel (MCCH), and a multicast traffic channel (MTCH).

As described above, the RLC layer of the second layer supports reliable data transfer. Also, the RLC layer serves to perform segmentation and/or concatenation for data received from its upper layer to control a size of the data so that the lower layer can transmit the data to a radio interval. Also, in order to ensure various quality of services (QoS) required by each radio bearer, the RLC layer of the second layer provides three types of operation modes, transparent mode (TM), unacknowledged mode (UM), and an acknowledged mode (AM). Particularly, the AM RLC layer performs a retransmission function through an automatic repeat and request (ARQ) function for reliable data transmission. Hereinafter, the UM mode and the AM mode of the RLC layer will be described in more detail.

The UM RLC layer transmits PDUs by adding a PDU header to each PDU, so that the receiving side can identify what PDU has been lost during transmission, wherein the PDU header includes a sequence number (hereinafter, abbreviated as "SN"). In accordance with this function, the UM RLC layer mainly serves to transmit broadcast/multicast data or real-time data such as voice (for example, VoIP) or streaming of a packet service domain (hereinafter, abbreviated as "PS domain") in a user plane. Also, the UM RLC layer serves to transmit RRC message, which does not need acknowledgement, among RRC messages transmitted to a specific user equipment or a specific user equipment group within a cell, in a control plane.

Like the UM RLC layer, the AM RLC layer constitutes RLC PDUs by adding a PDU header including SN thereto. However, the AM RLC layer is different from the UM RLC layer in that the receiving side performs acknowledgement in response to the PDUs transmitted from the transmitting side. The reason why the receiving side performs acknowledgement in the AM RLC layer is to request the transmitting side to re-transmit PDU which the receiving side has not received. This retransmission function is a main feature of the AM RLC layer. Accordingly, the AM RLC layer is to ensure error-free data transmission through re-transmission. For this reason, the AM RLC layer serves to transmit unreal time packet data such as TCP/IP of the PS domain in the user plane. Also, the AM RLC layer serves to transmit RRC message, which necessarily requires acknowledgement, among the RRC messages transmitted to a specific user equipment within a cell, in the control plane.

In view of a directional aspect, the UM RLC layer is used for uni-directional communication whereas the AM RLC layer is used for bi-directional communication due to a feedback from the receiving side. The UM RLC layer is also different from the AM RLC layer in view of a structural aspect. Namely, although the UM RLC layer allows one RLC entity to perform a transmission function or a receiving function, the AM RLC layer allows both an entity performing a transmission function and an entity performing a receiving function to exist in one RLC entity.

The reason why that the AM RLC layer is complicated is caused by a retransmission function. For retransmission management, the AM RLC entity includes a retransmission buffer in addition to a transmission buffer and uses a transmission and reception window for flow control. The AM RLC entity of the transmitting side performs a polling procedure to request a peer RLC entity of the receiving side to transmit a status report, and the receiving side transmits the status report to the transmitting side to report reception acknowledgement information. Also, the AM RLC entity performs a function constituting a status PDU to transfer the status report.

The AM RLC entity supports the aforementioned functions using a plurality of protocol parameters, status parameters, timers, etc. In the AM RLC layer, PDUs used to control transmission of data such as status report or status PDU will be referred to as control PDUs, and PDUs used to transfer user data will be referred to as data PDUs.

As described above, the AM RLC entity of the transmitting side includes two buffers, i.e., a transmission buffer and a retransmission buffer. Data which have not yet been included in RLC PDU, among data transferred from an upper entity, are stored in the transmission buffer. RLC PDU transferred to a lower entity is stored in the retransmission buffer until the receiving side acknowledges that the RLC PDU has been successfully received therein.

Figure 4:
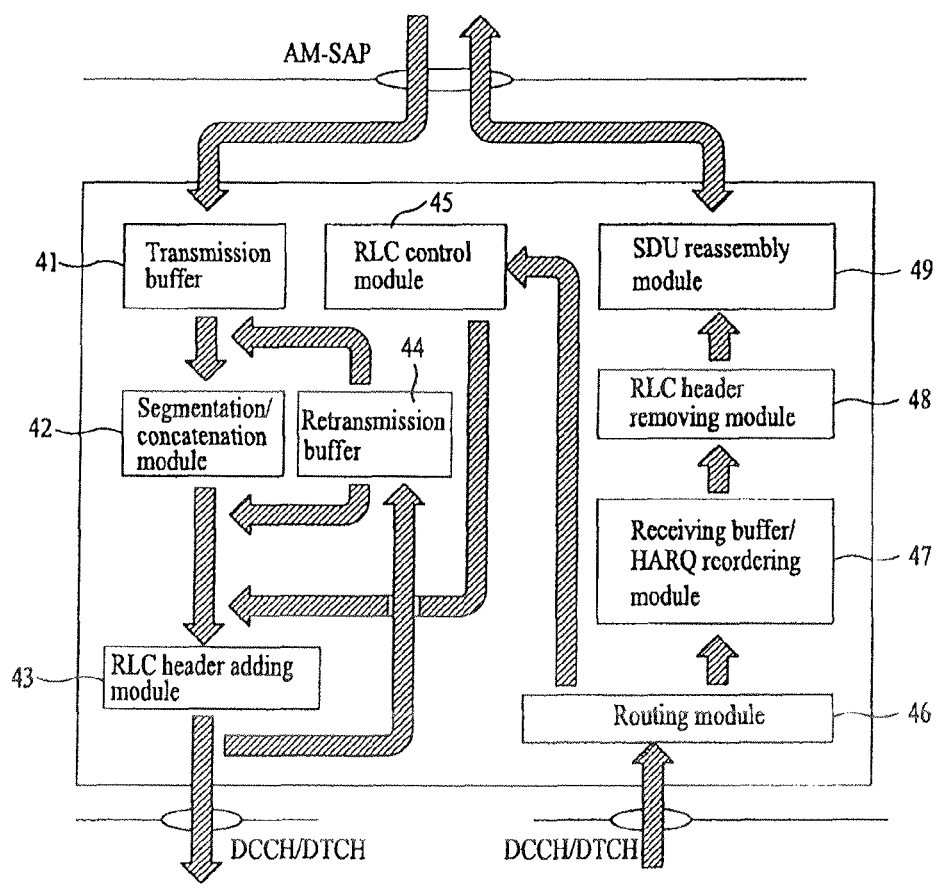
FIG. 4 is a diagram illustrating an example of a functional block of RLC AM entity.

FIG. 4 is a diagram illustrating an example of a functional block of the RLC AM entity.

Referring to FIG. 4, an RLC SDU (Service Data Unit) transferred from the upper layer (RRC layer or PDCP sub-layer) is stored in a transmission buffer 41. A segmentation/concatenation module 42 performs segmentation and/or concatenation for at least one RLC SDU transferred from the transmission buffer 41. Segmentation and/or concatenation is performed at a specific transmission opportunity in accordance with a transport block size reported from the lower layer. As a result, the RLC PDU generated by the RLC AM entity can have a size desired by the lower layer. An RLC header adding module 43 adds an RLC header to a data block transferred from the segmentation/concatenation module 42. An RLC AMD PDU is generated as the RLC PDU header is added to the data block.

Figure 5:
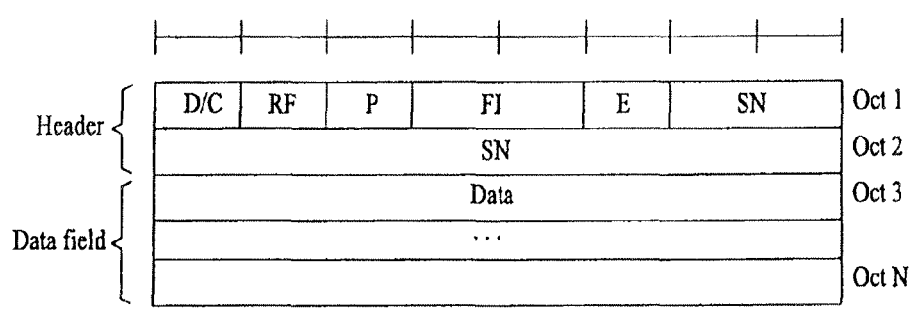
FIG. 5 is a diagram illustrating a basic structure of AMD PDU.

FIG. 5 is a diagram illustrating a basic structure of the AMD PDU. The AMD PDU includes a PDU header part and a data field part. The header can include a fixed part and an extended part, wherein the fixed part exists in every AMD PDU and the extended part is included in the AMD PDU only if necessary. The extended part is included in the AMD PDU if one or more data field elements exist in the AMD PDU.

The fixed part includes a D/C field, a re-segmentation flag (RF) field, a polling (P) field, a framing info (FI) field, an extension bit (E) field and a sequence number (SN) field. The D/C field includes information identifying whether a corresponding AMD PDU is a data PDU or a control PDU. The RF field includes information indicating whether a corresponding RLC PDU is a single perfect AMD PDU or a part of another AMD PDU. The polling field includes information indicating whether the AM RLC entity of the transmitting side will request the peer AM RLC entity of the receiving side to transmit status report. The FI field includes information indicating that the RLC SDU included in the AMD PDU has been segmented from a start part and/or an end part of the data field. The E field includes information indicating whether the data field starts behind the fixed part or whether additional E field and LI field follow behind the fixed part. The SN field includes a sequence number of the AMD PDU.

Referring to FIG. 4 again, the AMD PDU generated as the header is added by the RLC header adding module 43 is transferred to the lower layer, for example, a MAC layer. Before the AMD PDU is transferred to the lower layer, additional procedure such as ciphering can be performed for the AMD PDU if necessary. The AMD PDU transferred to the lower layer is stored in the retransmission buffer 44 to perform a retransmission function.

If the RLC AM entity performs a receiving function, a routing module 46 performs routing for the received RLC PDU in accordance with a type of the RLC PDU, so as to transfer a control PDU to an RLC control module 45 and an AMD PDU to a receiving buffer/HARQ reordering module 47. The receiving buffer/HARQ reordering module 47 stores AMD PDUs transferred from the routing module 46, and aligns them in the order of SN if they are not received in the order of SN. An RLC header removing module 48 removes the RLC header from the AMD PDU and transfers the resultant data to an SDU reassembly module 49. The SDU reassembly module 49 reassembles at least one or more RLC SDUs using the data transferred from the RLC header removing module and then transfers the resultant data to the upper layer.

The RLC AM entity of the receiving side transfers the status report to the transmitting side through the status PDU to report whether the at least one or more RLC PDUs transmitted from the transmitting side have been successfully received.

Figure 6:
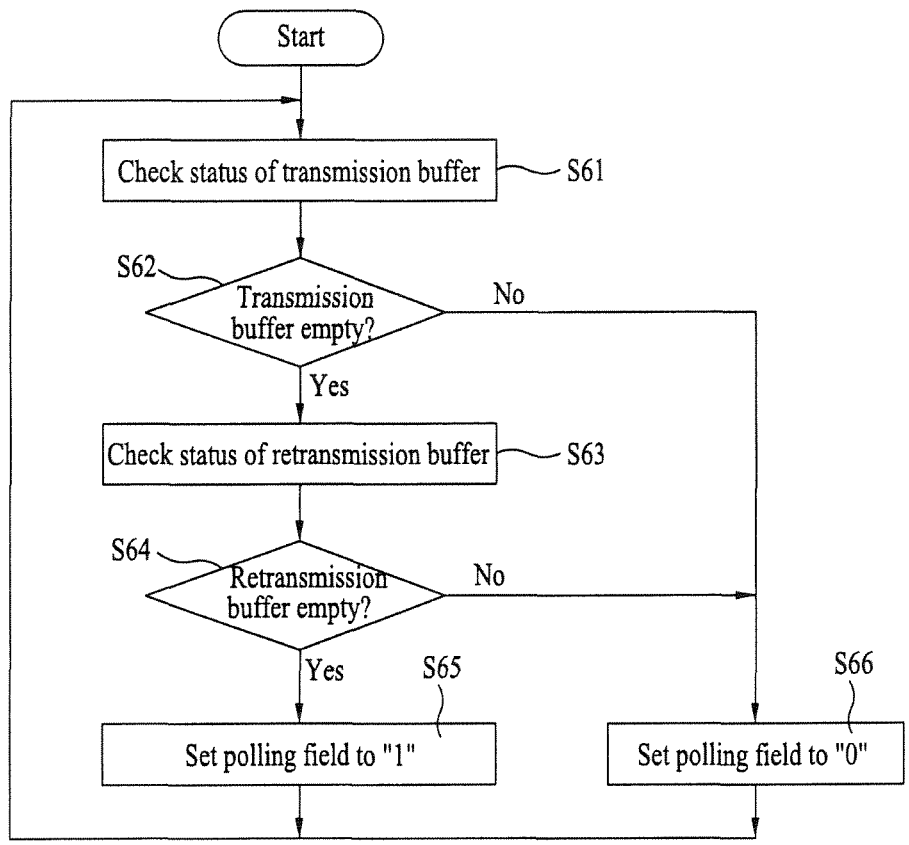
FIG. 6 is a flow chart illustrating a procedure according to one embodiment of the present invention.

FIG. 6 is a flow chart illustrating a procedure according to one embodiment of the present invention. The embodiment of FIG. 6 relates to an example of determining whether the RLC AM entity performs a polling procedure in accordance with the statuses of the transmission buffer and the retransmission buffer. Namely, if there are no data to be transmitted to the receiving side in both the transmission buffer and the retransmission buffer, the RLC AM entity performs the polling procedure to request the receiving side to transmit the status report. When determining whether there are data to be transmitted to the receiving side in the retransmission buffer, a data block for which retransmission request information is not received from the receiving side is excluded.

Referring to FIG. 4 and FIG. 6, the AM RLC entity checks the status of the transmission buffer 41 [S61] and identifies whether data to be transmitted to the receiving side are stored in the transmission buffer 41 [S62]. If the data to be transmitted to the receiving side are stored in the transmission buffer 41, the AM RLC entity does not perform the polling procedure. Namely, the AM RLC entity sets the P field to "0," wherein the P field exists in a header of the AMD PDU to be transmitted to the receiving side [S66]. If the P field receives the AMD PDU set to "0," the receiving side regards that the transmitting side does not request transmission of the status report.

If the data to be transmitted to the receiving side are not stored in the transmission buffer 41, i.e., if the transmission buffer 41 is empty, the AM RLC entity checks the status of the retransmission buffer 44 [S63] to identify whether data to be transmitted to the receiving side are stored in the retransmission buffer [S64]. When determining whether the data to be transmitted to the receiving side are stored in the retransmission buffer 44, a data block for which retransmission request information is not received from the receiving side is excluded. In other words, even though at least one RLC PDU is stored in the retransmission buffer 44, if the status report or acknowledgement for the at least one RLC PDU is not received from the receiving side, it is regarded that the retransmission buffer 44 is empty.

In step S64, if the data to be transmitted to the receiving side are stored in the retransmission buffer 44, the AM RLC entity does not perform the polling procedure. Namely, the AM RLC entity sets the P field to "0," wherein the P field exists in the header of the AMD PDU to be transmitted to the receiving side [S66].

If the data to be transmitted to the receiving side are not stored in the retransmission buffer 44, the AM RLC entity performs the polling procedure. Namely, the AM RLC entity sets the P field to "1," wherein the P field exists in the header of the AMD PDU to be transmitted to the receiving side [S65]. If the P field receives the AMD PDU set to "1", the receiving side regards that the transmitting side requests transmission of the status report, and transmits to the transmitting side the status report for at least one RLC PDU received from the transmitting side.

In the embodiment of FIG. 6, although the status of the retransmission buffer has been checked after the status of the transmission buffer is checked, this checking order may be changed. Namely, the status of the transmission buffer may be checked after the status of the retransmission buffer is checked. Also, the status of the transmission buffer and the status of the retransmission buffer may simultaneously be checked.

Figure 7:
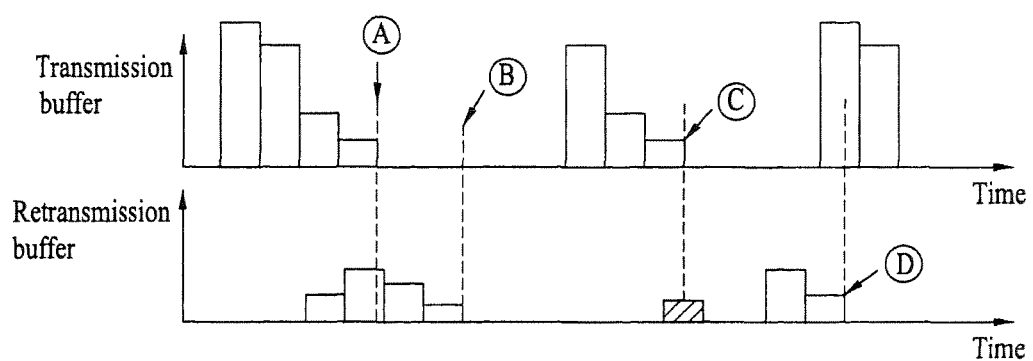
FIG. 7 is a diagram illustrating the embodiment of FIG. 6 in view of another aspect.

FIG. 7 is a diagram illustrating the embodiment of FIG. 6 in view of another aspect. In FIG. 7, a horizontal axis is a time axis, and a vertical axis represents the amount of data stored in the transmission buffer and the retransmission buffer. Although the transmission buffer is empty at a timing point "A," since data to be transmitted to the receiving side are stored in the retransmission buffer, the polling procedure is not triggered. The data to be transmitted to the receiving side will not remain in the transmission buffer and the retransmission buffer at a timing point "B." At this time, the AM RLC layer performs the polling procedure.

There are no data to be transmitted to the receiving side in the transmission buffer at a timing point "C" but at least one RLC PDU is stored in the retransmission buffer. However, if acknowledgements for the at least one RLC PDU stored in the retransmission buffer is not received from the receiving side, it is regarded that there are no data to be transmitted to the receiving side in the retransmission buffer. Accordingly, the RLC AM entity performs the polling procedure even at the timing point "C." Although the retransmission buffer is empty at a timing point "D," since data to be transmitted to the receiving side are stored in the transmission buffer, the RLC AM entity does not perform the polling procedure.

According to other embodiments of the present invention, it is considered that the RLC AM entity performs the polling procedure considering the sequence number of the RLC PDU in addition to the status of the transmission buffer and the status of the retransmission buffer. Namely, in a state that data to be transmitted to the receiving side do not remain in the transmission buffer and the retransmission buffer, the polling procedure can be performed for each of the following cases:

1. When an AMD PDU stored in the retransmission buffer is transmitted, in case where the AMD PDU has the highest sequence number among AMD PDUs to be retransmitted;

2. When an AMD PDU stored in the retransmission buffer is transmitted, in case where the AMD PDU has the highest sequence number among AMD PDUs for which status report indicating that the receiving side has not received successfully the AMD PDUs is received;

3. When an AMD PDU stored in the retransmission buffer is transmitted, in case where the AMD PDU is generated most recently among AMD PDUs to be retransmitted;

4. When an AMD PDU stored in the retransmission buffer is transmitted, in case where the AMD PDU is generated most recently among AMD PDUs for which NACKs have been received from the receiving side;

5. When an AMD PDU is transmitted from the transmission buffer, in case where the AMD PDU is generated most recently;

6. When an AMD PDU is transmitted from the transmission buffer, in case where data to be transmitted to the receiving side do not remain in the transmission buffer and the retransmission buffer any more;

7. When an AMD PDU is transmitted from the transmission buffer, in case where neither data to be transmitted to the receiving side nor AMD PDU to be retransmitted remain in the transmission buffer;

8. When an AMD PDU is transmitted from the transmission buffer, in case where neither data to be transmitted to the receiving side nor AMD PDU waiting for retransmission remain in the transmission buffer;

9. When an AMD PDU is transmitted from the transmission buffer, in case where data to be transmitted to the receiving side do not remain in the transmission buffer any more and at the same time an AMD PDU for which NACK has been received from the receiving side does not remain in the retransmission buffer;

10. When an AMD PDU is transmitted from the retransmission buffer, in case where the AMD PDU has the highest sequence number among the AMD PDUs to be retransmitted, and data to be transmitted to the receiving side do not remain in the transmission buffer;

11. When an AMD PDU is transmitted from the retransmission buffer, in case where the AMD PDU has the highest sequence number among the AMD PDUs for which NACKs have been received from the receiving side, and data to be transmitted to the receiving side do not remain in the transmission buffer; and 12. When an AMD PDU is transmitted from the retransmission buffer, in case where the AMD PDU is generated most recently among the AMD PDUs to be retransmitted, and data to be transmitted to the receiving side do not remain in the transmission buffer.

Figure 8:
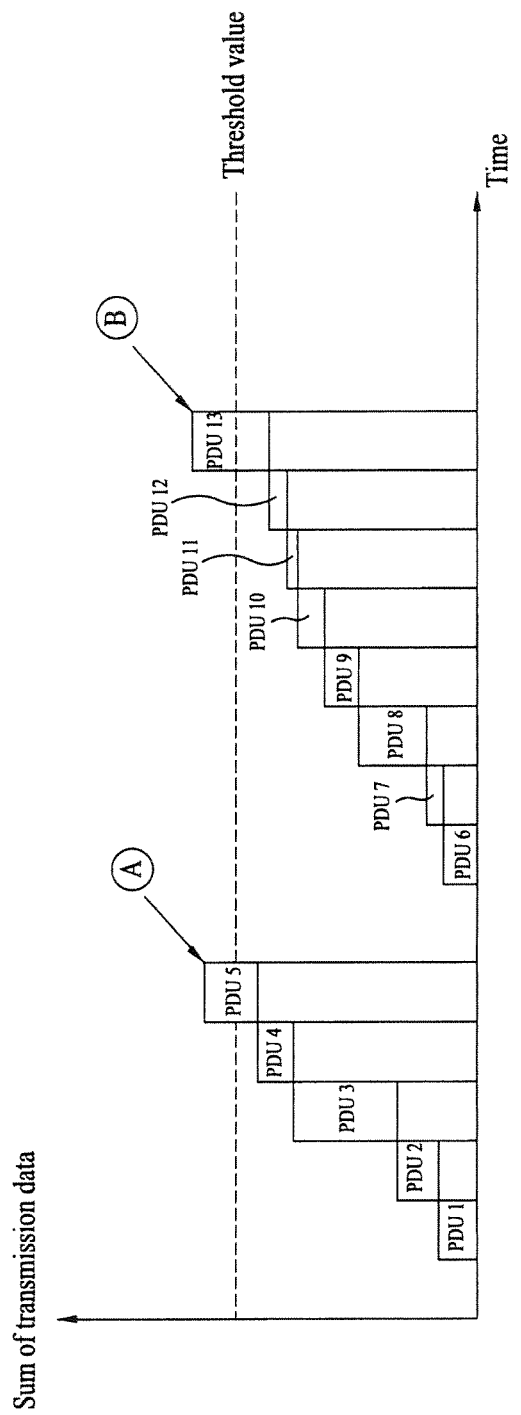
FIG. 8 is a diagram illustrating another embodiment of the present invention.

FIG. 8 is a diagram illustrating another embodiment of the present invention. In the embodiment of FIG. 8, an AM RLC entity performs a polling procedure at the time when sum of data included in AMD PDUs transmitted to the receiving side reaches a threshold value, which is previously set.

Referring to FIG. 8, supposing that PDU 1 to PDU 5 are transmitted to the receiving side in due order, sum of the data transmitted to the receiving side reaches a threshold value or greater at the time when PDU 5 is transmitted. At this time, the AM RLC entity performs the polling procedure. Namely, the AM RLC entity requests the receiving side to transmit the status report by setting a P field included in a header of PDU 5 to "1".

If the polling procedure is performed once, sum of data calculated to trigger the polling procedure is calculated again from the beginning. Namely, in FIG. 8, since sum of data exceeds the threshold value at the time when PDU 6 to PDU 13 are transmitted after the polling procedure is performed through PDU 5, the P field included in a header of PDU 13 is set to "1" again.

The embodiment of FIG. 8 can be achieved using a parameter named BYTE_SENT. Namely, BYTE_SENT is initiated to 0, and the RLC AM entity adds a size value of data included in an AMD PDU to BYTE_SENT whenever the AMD PDU is transmitted. The RLC AM entity performs the polling procedure by setting the P field included in the header of the AMD PDU transmitted at the time when BYTE_SENT exceeds the threshold value to "1". If the polling procedure is performed, the RLC AM entity resets BYTE_SENT to "0" and repeats the same procedure.

If the size of the data included in the AMD PDU transmitted to the receiving side is added to BYTE_SENT, various methods can be considered with respect to what value is taken as the size of the data. As described above, an AMD PDU includes a header part and a data field part, wherein the header part includes a fixed part and an extended part. Accordingly, a total size of the AMD PDU, a size of the data field part, or the size of the other part excluding the fixed part in the header could be the part added to the value BYTE_SENT.

For example, if the size of the data included in the data field part of the AMD PDU is only considered when sum of the size of the data is calculated, the data field is aligned per 1 byte. Accordingly, a counter can be increased per 1 byte of the data field included in each AMD PDU, and the polling procedure can be performed at the time when the counter value calculated for the AMD PDUs transmitted to the receiving side exceeds a predetermined threshold.

The aforementioned embodiments are achieved by combination of structural elements and features of the present invention in a predetermined type. Each of the structural elements or features should be considered selectively unless specified separately. Each of the structural elements or features may be carried out without being combined with other structural elements or features. Also, some structural elements and/or features may be combined with one another to constitute the embodiments of the present invention. The order of operations described in the embodiments of the present invention may be changed. Some structural elements or features of one embodiment may be included in another embodiment, or may be replaced with corresponding structural elements or features of another embodiment. Moreover, it will be apparent that some claims referring to specific claims may be combined with another claims referring to the other claims other than the specific claims to constitute the embodiment or add new claims by means of amendment after the application is filed.

The embodiments according to the present invention may be implemented by various means, for example, hardware, firmware, software, or their combination. If the embodiment according to the present invention is implemented by hardware, the embodiment of the present invention may be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

If the embodiment according to the present invention is implemented by firmware or software, the method of transmitting and receiving data in the wireless communication system according to the embodiment of the present invention may be implemented by a type of a module, a procedure, or a function, which performs functions or operations described as above. A software code may be stored in a memory unit and then may be driven by a processor. The memory unit may be located inside or outside the processor to transmit and receive data to and from the processor through various means which are well known.

It will be apparent to those skilled in the art that the present invention can be embodied in other specific forms without departing from the spirit and essential characteristics of the invention. Thus, the above embodiments are to be considered in all respects as illustrative and not restrictive. The scope of the invention should be determined by reasonable interpretation of the appended claims and all change which comes within the equivalent scope of the invention are included in the scope of the invention.

Industrial Applicability

The present invention can be used in a wireless communication system such as a mobile communication system or a wireless Internet system.

The invention claimed is:

1. A method for performing a polling procedure in a protocol layer performing a data retransmission function in a wireless communication system, the method comprising:
   in a radio link control (RLC) layer of a sender, setting a polling field of a data block to be transmitted to a receiver, wherein a value of the polling field is set according to a status of a transmission buffer and a retransmission buffer of the sender, and wherein the polling field is set further in consideration of a counter value;
   wherein the polling field is set to a value for triggering the receiver to transmit a status report to the sender if both the transmission buffer and the retransmission buffer of the sender are empty of data; and
   increasing the counter value per one byte of a data field of the data block, wherein the polling field is set to the value for triggering a polling if the counter value exceeds a predetermined threshold; and
   transmitting the data block to the receiver.

2. The method of claim 1, wherein the value for triggering is "1".

3. The method of claim 1, wherein the status report requests retransmission of a data block stored in the retransmission buffer.

4. A method for generating a data block in a protocol layer of a sender in a wireless communication system, the method comprising:
 generating a data block in a radio link control (RLC) layer of a sender, the data block comprising a polling field; and
 setting a value of the polling field of the data block according to a status of a transmission buffer and a retransmission buffer of the sender, and wherein the polling field is set further in consideration of a counter value; and
 wherein the value of the polling field is set to a value for triggering a receiver of the data block to transmit a status report to the sender if both the transmission buffer and the retransmission buffer of the sender are empty of data, increasing the counter value per one byte of a data field of the data block, wherein the polling field is set to the value for triggering a polling if the counter value exceeds a predetermined threshold; and
 transmitting the data block to the receiver.

5. The method of claim 4, wherein the value for triggering is "1".

6. The method of claim 4, wherein the status report requests retransmission of a data block stored in the retransmission buffer.

7. The method of claim 4, wherein the data block further comprises at least part of another data block the RLC layer receives from an upper layer.

8. A sender for performing a polling procedure while performing a data retransmission function in a wireless communication system, the sender comprising:
 a transmission buffer;
 a retransmission buffer; and
 a radio link control (RLC) layer setting a polling field of a data block to be transmitted to a receiver, wherein a value of the polling field is set according to a status of the transmission buffer and a status of the retransmission buffer, and wherein the polling field is set further in consideration of a counter value,
 wherein the polling field is set to a value for triggering the receiver to transmit a status report to the sender if both the transmission buffer and the retransmission buffer of the sender are empty of data, and wherein the counter value is increased per one byte of a data field of the data block, and the polling field is set to the value for triggering a polling if the counter value exceeds a predetermined threshold;
 a transmitter configured to transmit the data block to the receiver.

9. The sender of claim 8, wherein the value for triggering is "1".

10. The sender of claim 8, wherein the status report from the receiver requests retransmission of a data block stored in the retransmission buffer.

11. The sender of claim 8, wherein the RLC layer generates the data block in the RLC layer, the data block comprising the polling field and at least part of another data block received by the RLC layer from an upper layer.

12. A user equipment (UE) for performing a polling procedure in a protocol layer performing a data retransmission function in a wireless communication system, the UE comprising:
 a transmission buffer;
 a retransmission buffer;
 a controller configured to:
  set a polling field of a data block to be transmitted to a receiver, wherein a value of the polling field is set according to a status of the transmission buffer and a status of the retransmission buffer, and wherein the polling field is set further in consideration of a counter value,
  set the polling field to a value for triggering the receiver to transmit a status report to the sender if both the transmission buffer and the retransmission buffer of the sender are empty of data, wherein the counter value is increased per one byte of a data field of the data block, and the polling field is set to the value for triggering a polling if the counter value exceeds a predetermined threshold; and
 a transmitter configured to transmit the data block to the receiver.

* * * * *